US009178815B2

(12) United States Patent
Gasparakis et al.

(10) Patent No.: US 9,178,815 B2
(45) Date of Patent: Nov. 3, 2015

(54) NIC FLOW SWITCHING

(71) Applicants: Iosif Gasparakis, Tigard, OR (US); Peter P. Waskiewicz, Portland, OR (US); Patrick Connor, Beaverton, OR (US)

(72) Inventors: Iosif Gasparakis, Tigard, OR (US); Peter P. Waskiewicz, Portland, OR (US); Patrick Connor, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 157 days.

(21) Appl. No.: 13/785,693

(22) Filed: Mar. 5, 2013

(65) Prior Publication Data

US 2014/0254594 A1  Sep. 11, 2014

(51) Int. Cl.
H04L 29/06  (2006.01)
H04L 12/741  (2013.01)
H04L 12/28  (2006.01)
H04L 12/56  (2006.01)

(52) U.S. Cl.
CPC ...................................... H04L 45/74 (2013.01)

(58) Field of Classification Search
CPC ......... H04L 47/10; H04L 47/34; H04L 29/06; H04L 49/90; H04L 49/30; H04Q 11/0478
USPC .......................................................... 370/392
See application file for complete search history.

(56) References Cited

U.S. PATENT DOCUMENTS

| | | | | |
|---|---|---|---|---|
| 5,535,338 A | * | 7/1996 | Krause et al. ................. | 709/222 |
| 5,920,705 A | * | 7/1999 | Lyon et al. .................... | 709/240 |
| 6,304,903 B1 | * | 10/2001 | Ward ............................. | 709/224 |
| 6,667,972 B1 | * | 12/2003 | Foltan et al. .................. | 370/354 |
| 7,274,706 B1 | * | 9/2007 | Nguyen et al. ................ | 370/419 |
| 7,773,598 B2 | * | 8/2010 | Lindholm et al. ............ | 370/392 |
| 8,155,135 B2 | * | 4/2012 | Aloni et al. ................... | 370/419 |
| 2004/0156379 A1 | * | 8/2004 | Walls et al. ................... | 370/412 |
| 2008/0205402 A1 | * | 8/2008 | McGee et al. ................ | 370/392 |
| 2009/0006710 A1 | * | 1/2009 | Daniel et al. ................. | 710/315 |
| 2009/0172301 A1 | * | 7/2009 | Ebersole et al. ............. | 711/154 |
| 2010/0142374 A1 | * | 6/2010 | Yoon et al. .................... | 370/235 |
| 2010/0250868 A1 | * | 9/2010 | Oshins .......................... | 711/154 |
| 2010/0284404 A1 | * | 11/2010 | Gopinath et al. ............. | 370/392 |
| 2011/0182292 A1 | * | 7/2011 | Ronciak et al. ............... | 370/392 |
| 2013/0058342 A1 | * | 3/2013 | Casado et al. ................ | 370/392 |
| 2013/0061047 A1 | * | 3/2013 | Sridharan et al. ............ | 713/162 |
| 2014/0122634 A1 | * | 5/2014 | Conner et al. ................ | 709/212 |
| 2014/0321469 A1 | * | 10/2014 | Goel ............................. | 370/392 |
| 2014/0369194 A1 | * | 12/2014 | Friedman et al. ............. | 370/235 |

* cited by examiner

*Primary Examiner* — Melvin Marcelo
*Assistant Examiner* — Sanjay K Dewan
(74) *Attorney, Agent, or Firm* — Law Office of R. Alan Burnett, P.S

(57) ABSTRACT

Methods, apparatus, and systems for implementing in Network Interface Controller (NIC) flow switching. Switching operations are effected via hardware-based forwarding mechanisms in apparatus such as NICs in a manner that does not employ use of computer system processor resources and is transparent to operating systems hosted by such computer systems. The forwarding mechanisms are configured to move or copy Media Access Control (MAC) frame data between receive (Rx) and transmit (Tx) queues associated with different NIC ports that may be on the same NIC or separate NICs. The hardware-based switching operations effect forwarding of MAC frames between NIC ports using memory operations, thus reducing external network traffic, internal interconnect traffic, and processor workload associated with packet processing.

30 Claims, 11 Drawing Sheets

| 0xA1001500 | 0xA1001000 | 0xA1002000 |
| --- | --- | --- |
| 0xA1001508 | 0xA1003000 | 0xA1004000 |
| ⋮ | ⋮ | ⋮ |
| 0xA10015F8 | 0xA101F000 | 0xA1020000 |

NIC FLOW SWITCHING

FIELD OF THE INVENTION

The field of invention relates generally to computer networks and, more specifically but not exclusively relates to methods and apparatus for supporting flow switching within a Network Interface Controller (NIC).

BACKGROUND INFORMATION

Access to computer networks has become a ubiquitous part of today's computer usage. Whether accessing a Local Area Network (LAN) in an enterprise environment to access shared network resources, or accessing the Internet via the LAN or other access point, it seems users are always logged on to at least one service that is accessed via a computer network. Moreover, the rapid expansion of cloud-based services has lead to even further usage of computer networks, and these services are forecast to become ever-more prevalent.

Expansion of network usage, particularly via cloud-based services, has been facilitated via substantial increases in network bandwidths and processor capabilities. For example, broadband network backbones typically support bandwidths of 10 Gigabits per second (Gbps) or more, while the standard for today's personal computers is a network interface designed to support a 1 Gbps Ethernet link. On the processor side, processors capabilities have been increased through both faster clock rates and use of more than one processor core. For instance, today's PCs may employ a dual-core processor or a quad-core processor, while servers may employ processors with even more cores. For some classes of servers, it is common to employ multiple processors to enhance performance. In addition, it is envisioned that much of the future processor performance increases will result from architectures employing greater numbers of cores, and that future servers may employ greater numbers of processors.

In computer systems, network access is typically facilitated through use of a Network Interface Controller (NIC), such as an Ethernet NIC. In recent years, server NICs have been designed to support for many optimizations for multi-core, multi-processor platform architectures. These optimizations include Receive Side Scaling (RSS) and Application Targeted Routing (ATR).

In recent years, virtualization of computer systems has seen rapid growth, particularly in server deployments and data centers. Under a conventional approach, a server runs a single instance of an operating system directly on physical hardware resources, such as the CPU, RAM, storage devices (e.g., hard disk), network controllers, I/O ports, etc. Under a virtualized approach, the physical hardware resources are employed to support corresponding virtual resources, such that multiple Virtual Machines (VMs) may run on the server's physical hardware resources, wherein each virtual machine includes its own CPU allocation, memory allocation, storage devices, network controllers, I/O ports etc. Multiple instances of the same or different operating systems then run on the multiple VMs. Moreover, through use of a virtual machine manager (VMM) or "hypervisor," the virtual resources can be dynamically allocated while the server is running, enabling VM instances to be added, shut down, or repurposed without requiring the server to be shut down. This provides greater flexibility for server utilization, and better use of server processing resources, especially for multi-core processors and/or multi-processor servers.

Under a conventional approach employing server virtualization, physical or logical cores (such as those implemented in processors using Intel® Corporation's Hyper-Threading™ architectures) are allocated to VM's at a similar ratio, such as 1:1. As packets are received at NIC receive (Rx) ports, some initial packet processing operations are performed to determine where in system memory the packets are to be written, which entails a DMA (direct memory access) write of the packet from a NIC input buffer to a buffer in system memory allocated to the VM that is the consumer of the packet or otherwise is to be implemented for performing packet forwarding operations. DMA operations are usually facilitated using high-speed interconnects such as Peripheral Component Interconnect Express (PCIe) links that are coupled between a NIC and the multi-core host processor. PCIe employs packet-based memory transactions (e.g., DMA writes to system memory) over a multi-lane serial link structure, enabling inbound traffic to be multiplexed effectively using applicable queuing techniques. Once in system memory, additional forwarding-related operations are performed by software-based entities using host processor resources, such as networking software that is part of an operating system running on the host processor or networking software running on a VM.

Currently, for more efficient packet processing, NICs segment their receive and transmit (Tx) dedicated memory to queues (also commonly referred to as buffers), usually equal in number to the number of physical or logical cores in the host processor. Through RSS and advanced filtering mechanisms such as Intel Corporation's Flow Director, network flows get assigned to Rx queues. Each core in the system processes packets from a specific Rx and Tx queue pair through use of interrupt affinity, whereby (ideally) maximum parallelization is achieved as network traffic is load balanced by the NIC with flows being spread to different queues and so each core gets a (relatively) fair share of the total received network traffic. Although this has been a good technique, it does not scale well for NICs operating at higher bandwidths, such as 10+ Gbps. In particular, the PCIe interconnect(s) becomes saturated and the processor caches are prone to thrashing. In modern data center servers where several virtual machines (VMs) run in the same host sharing the same NIC, packet processing becomes a bottleneck. In addition, VM-to-VM communication, even within the same system, occurs via network communication, which typically involves use of an external switch.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 5c is a combination schematic block diagram and data flow diagram illustrating an example of a hardware-based MAC frame forwarding process implemented using the computer architecture of FIG. 5a;

DETAILED DESCRIPTION

Embodiments of methods and apparatus for supporting flow switching within Network Interface Controllers are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In accordance with aspects of the embodiments now disclosed, hardware-based forwarding of data in connection with network-based data transfers is facilitated in a manner that does not involve external network switching or CPU processor resources. In accordance with one aspect, the MAC (Media Access Control) controlling a given port (i.e., an ingress MAC) is configured to receive a packet and determine that it should be forwarded by another port in the system. This determination is made without the host processor examining the packet. The ingress MAC then queues the packet to be forwarded by another MAC (egress MAC). This queuing is again done without use of the host processor. In one embodiment, each MAC configured to implement these techniques is configured to implement a set of forwarding filters/rules that determine if a packet is to be immediately forwarded and, if so, which egress MAC and queue to send it to. To avoid locking issues or semaphore checking that may require processor intervention, in one embodiment each egress port is configured with one or more queues dedicated for forwarding by another port. For example, if there were three single port MACs, each MAC would dedicate two sets of one or more queues for forwarding by other MACs in the system. In one embodiment, this configuration is adjustable and configured at initialization time or when plug and play events occur, such as in response to insertion or activation of a new NIC in the system.

Figures 1, 3:
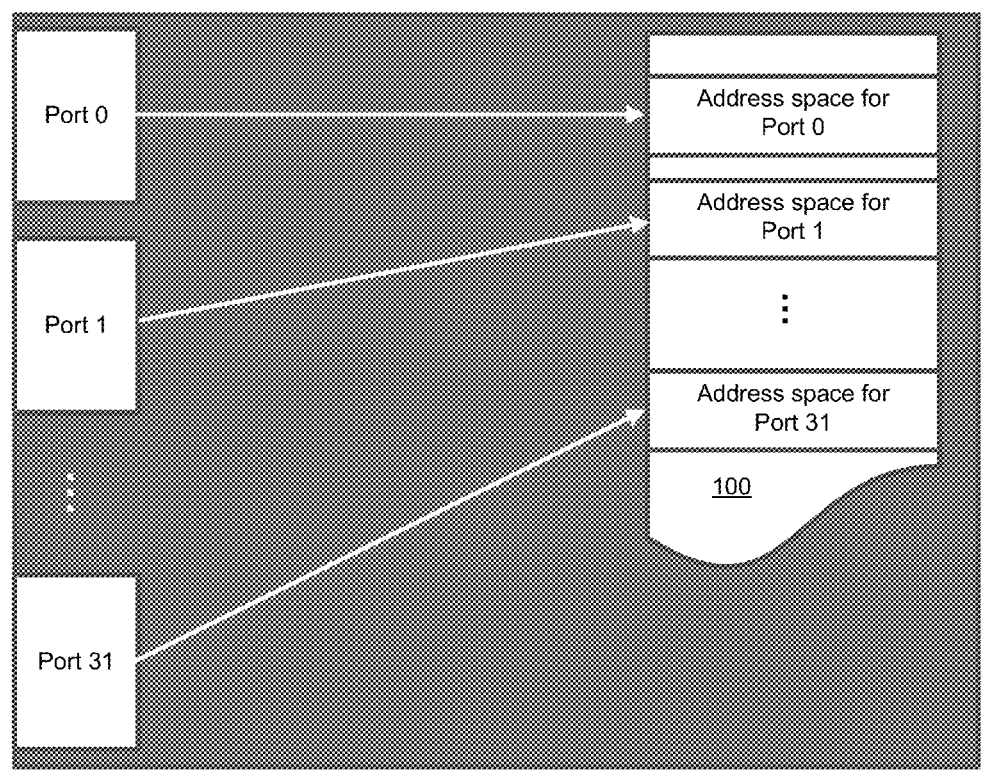
FIG. 1 shows a high-level view of a memory address space allocation under which respective address spaces within the address space of a system memory are allocated to 32 network ports in a computer system.
FIG. 3 is a block diagram illustrating an exemplary set of queue address offsets for a corresponding NIC port of FIG. 1, as mapped in FIG. 2.

FIG. 1 depicts a high-level view of a memory address space allocation according to one embodiment under which respective address spaces within the address space of a memory 100 are allocated to 32 network ports (depicted as Ports 0, 1 ... 31) in a computer system 102. Generally, the 32 network ports would be provided (collectively) by a plurality of NICs implemented in system 102 (NICs not shown). For example, 32 network ports could be supported through use of eight NICs, each providing 4 network ports, four S-port NICs, sixteen dual-port NICs, or a combination of NICs having different numbers of ports. In one embodiment, the NICs are members of the same NIC family. In addition, the memory address space allocation for 32 ports is merely exemplary, as a similar memory allocation scheme may be applied to substantially any number of ports.

Figure 2:
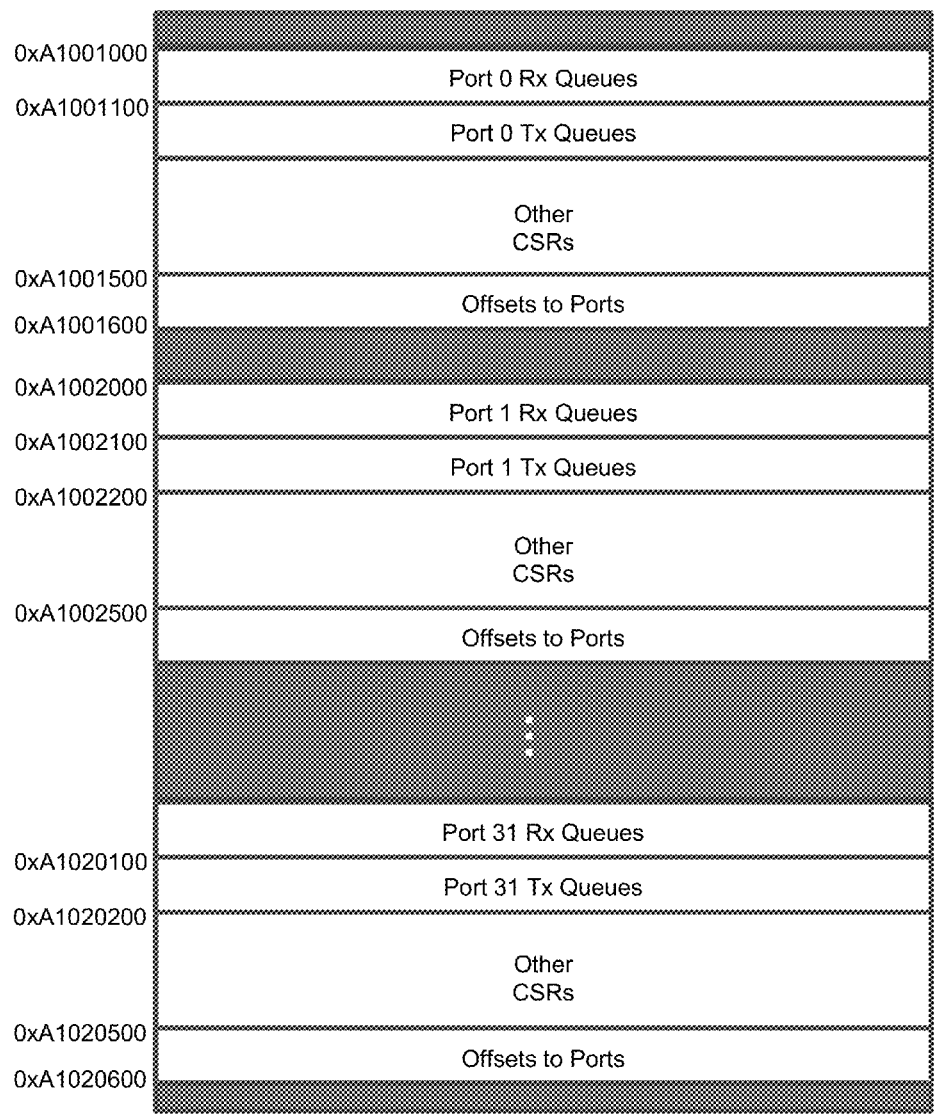
FIG. 2 is a block diagram illustrating an exemplary set of port queue address mappings and forwarding queue address offsets employed to facilitated aspects of hardware based forwarding, according to one embodiment.

FIG. 2 shows further details of the port memory space allocation of FIG. 1. As shown, in addition to allocating memory address spaces for respective port Rx and Tx queues, a portion of each port's allocated address space is employed for storing offsets (i.e., to locate) other ports. FIG. 2 further shows an exemplary set of memory addresses implemented using 64 bit addressing. Under this example it is further assumed that the family of the NICs of system 102 have their memory mapped starting with the Rx queues totaling 256 bytes, followed by Tx queues of the same size, followed by the Control/Status Registers (CSRs) taking 768 bytes of address space. It is noted that the sizes of the queues and address spaces in this example are greatly reduced when compared to an actual implementation to make the addressing and offsets easier to follow; one having skill in the art will recognize that a queue and/or CSR address space may comprise a size that is $2^n$ times greater than the values depicted.

In addition to the foregoing queue and CSR allocations, the memory map allocates 256 bytes following the CSRs that is dedicated to port address offsets and contain 32×8 bytes of data, with each 8 byte segment representing the base address of a corresponding port in the system. By way of example, FIG. 3 shows the addresses for Port 0. In one embodiment, software (e.g., via an Operating System driver or another module) is employed for allocating the address spaces and ensuring that for each port in the system, all the base addresses of all the ports are correctly populated.

Under a memory address space allocation scheme having equal size queue offsets, such as depicted in FIG. 2, it is possible to calculate the address of any Rx or Tx queue using the formula, Address of Rx/Tx Queue=Port base address+offset to Rx/Tx queues+Queue No.*Queue Size Under embodiments where the NICs belong to same family, they all share the same offset to Rx/Tx queues, and thus it is straightforward to configure the applicable software to be aware of the queue numbers and queue size for each port. Of course, schemes for a determining queue addresses with variable-size queues could also be implemented.

Figure 4:
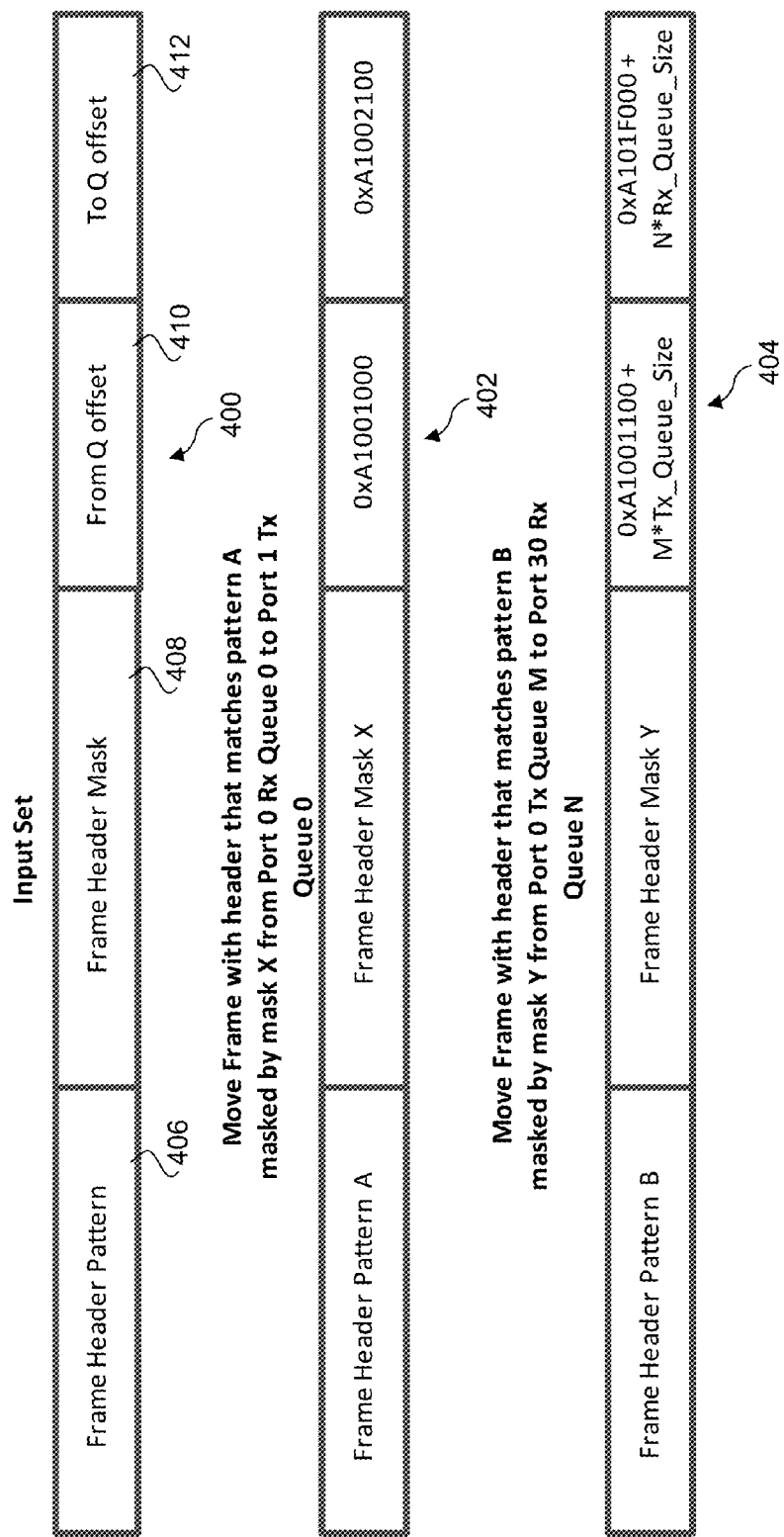
FIG. 4 is a block diagram illustrating examples of input sets used for filtering MAC frames and forwarding filtered frames between queues.

In conjunction with use of the foregoing memory address space allocation and mapping scheme, a hardware-based forwarding mechanism may be implemented that effects forwarding of packet data between NIC ports in a manner that bypasses the conventional packet forwarding path, thereby reducing the interconnect traffic and processor cycle allocation for software-based forwarding. The hardware forwarding mechanism takes as an input a network protocol frame header pattern (e.g., MAC frame header pattern) with its corresponding mask together with the queue offset that this frame is expected to appear on and the offset of the queue that that frame will be moved to. FIG. 4 shows an example of a general input set 400 followed by an example of an Rx queue 0 of Port 0 to Tx queue 0 of Port 1 input set 402 and an example of a Tx queue M of Port 0 to Rx Queue N of Port 0 input set 404.

The general input set 400 includes MAC frame filter data comprising a frame header pattern 406 and a frame header mask 408, and queue forwarding data comprising a "from" (q)ueue offset 410 and a "to" (q)ueue offset 412. Queue 0 input set 402 includes a frame header pattern 'A', a frame header mask 'X', a from queue offset of 0xA1001000 and a to queue offset of 0xA1002100. The effect of these field values when implemented via the hardware mechanism is to cause a frame with a header that matches pattern 'A' masked by mask 'X' to be moved from the Port 0 Rx queue to the Port 1 Tx queue 0. In accordance with the field values of queue 0 input set 404, a frame with a header that matches pattern 'B' masked by mask 'Y' is cause to be moved from the Port 0 Tx queue M to the Port 30 Rx queue N.

More generally, the frame header pattern 406 and frame header mask 408 are implemented as a filter or rule (as used herein, both filters and rules are collectively referred to as filter data) to filter out MAC frames with header data matching the frame header pattern and frame header mask criteria. The from queue offset 410 and the to queue offset 412 for a given input set defining a mapping between a first queue a MAC frame is to be or is already stored in to a second queue the MAC frame (data) is to be moved to or copied to via a corresponding memory move or memory write operation. The from and to queue offsets define an address offset relative to a base address defined for the address space implemented by the NIC(s), which is provided to each NIC during system initialization or NIC installation, as further detailed below.

With respect to network communication, each OS employs a set of software-based networking components (collectively referred to herein as "networking") including a conventional network stack. Each VM also includes a virtual NIC that is mapped to a physical NIC or NIC port in the host system. Since multiple virtual NICs may be mapped to the same physical NIC port, each virtual NIC has its own virtual MAC address. MAC addresses comprise a sequence of 6 octets (48 bits total), and are unique for each physical network interface (i.e., each NIC port has a unique MAC). The MAC addresses typically comprise universally administered addresses that are assigned to each device network interface by its manufacturer. Accordingly, each of the NIC ports or NICs (a NIC shown alone in the drawings herein includes a single port) has a unique 6 octet MAC address. Meanwhile, each virtual NIC will include a corresponding virtual MAC address that is used internally (by the VM OS) for networking purposes. The VMM is configured to translate between the virtual MAC addresses and the physical MAC addresses implemented by the system NIC hardware.

Figure 5:
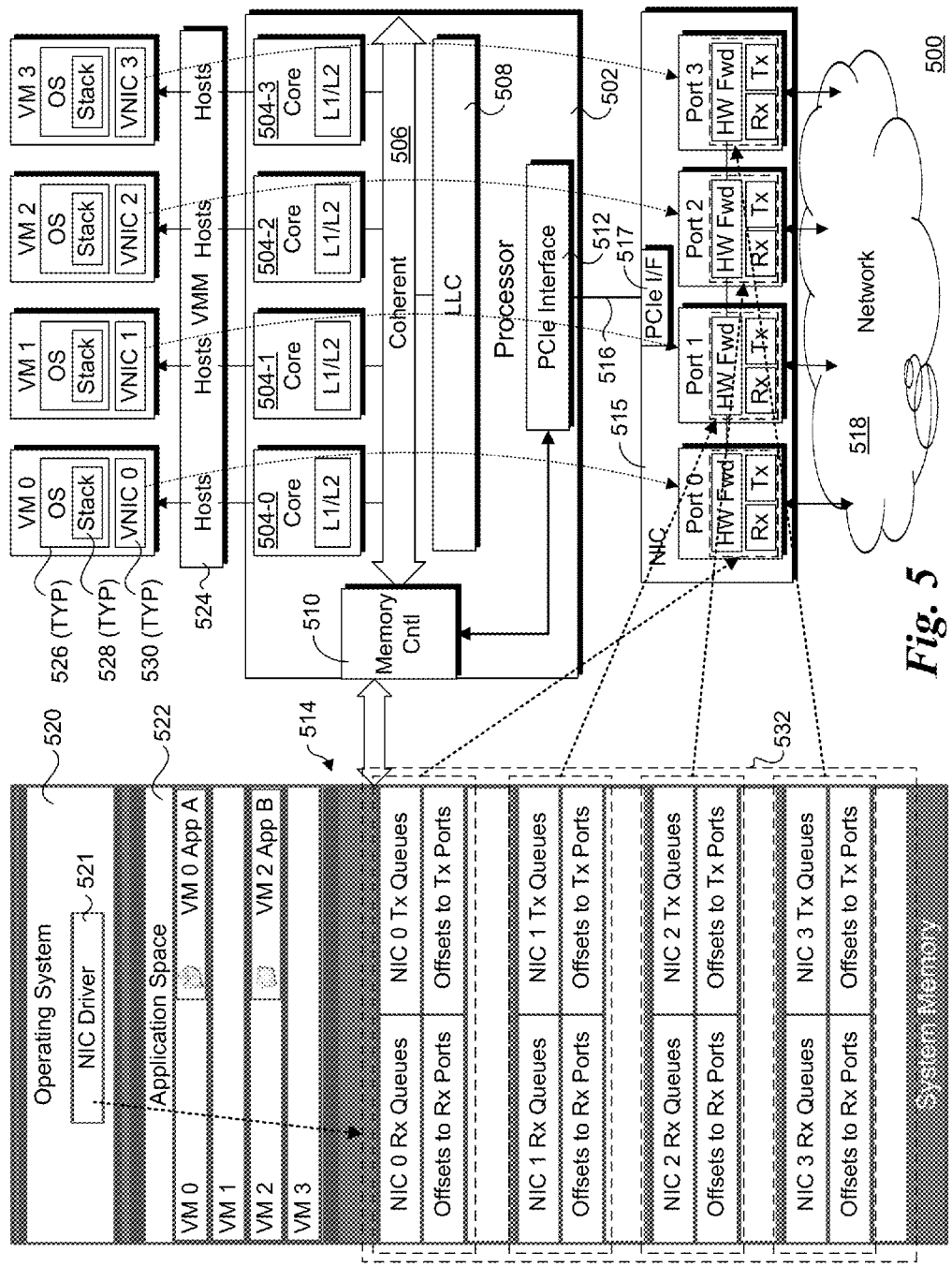
FIG. 5 is a schematic block diagram illustrating an exemplary computer system including a 4-port NIC that is configured during run-time to host four virtual machines, and further showing queue forwarding data managed by a NIC driver, according to one embodiment.

As discussed above, through use of the hardware forwarding mechanisms and appropriately configured input sets, forwarding of packets (i.e., packet data encapsulated in MAC-layer frames) may be effected without use of the conventional packet forwarding path and its utilization of corresponding hardware resources. This may be more clearly understood through use of a system architecture diagram, such as illustrated by a system architecture 500 diagram in FIG. 5.

System architecture 500 includes a processor 502 (aka Central Processing Unit or CPU) including four processor cores 504-0, 504-1, 504-2, and 504-3, each with its own level 1 and level 2 (L1 and L2) caches. The processor cores 504 are coupled to a coherent interconnect fabric 506 to which a distributed last level cache (LLC) 508 and a memory controller 510 are also coupled. Processor 502 further includes a PCIe interface 512 that is operatively coupled to memory controller 510 either through a direct path (as shown), through coherent interconnect 506, and/or through one or more interconnect-to-interconnect (or fabric-to-fabric) bridges (not shown).

Figure 7A:
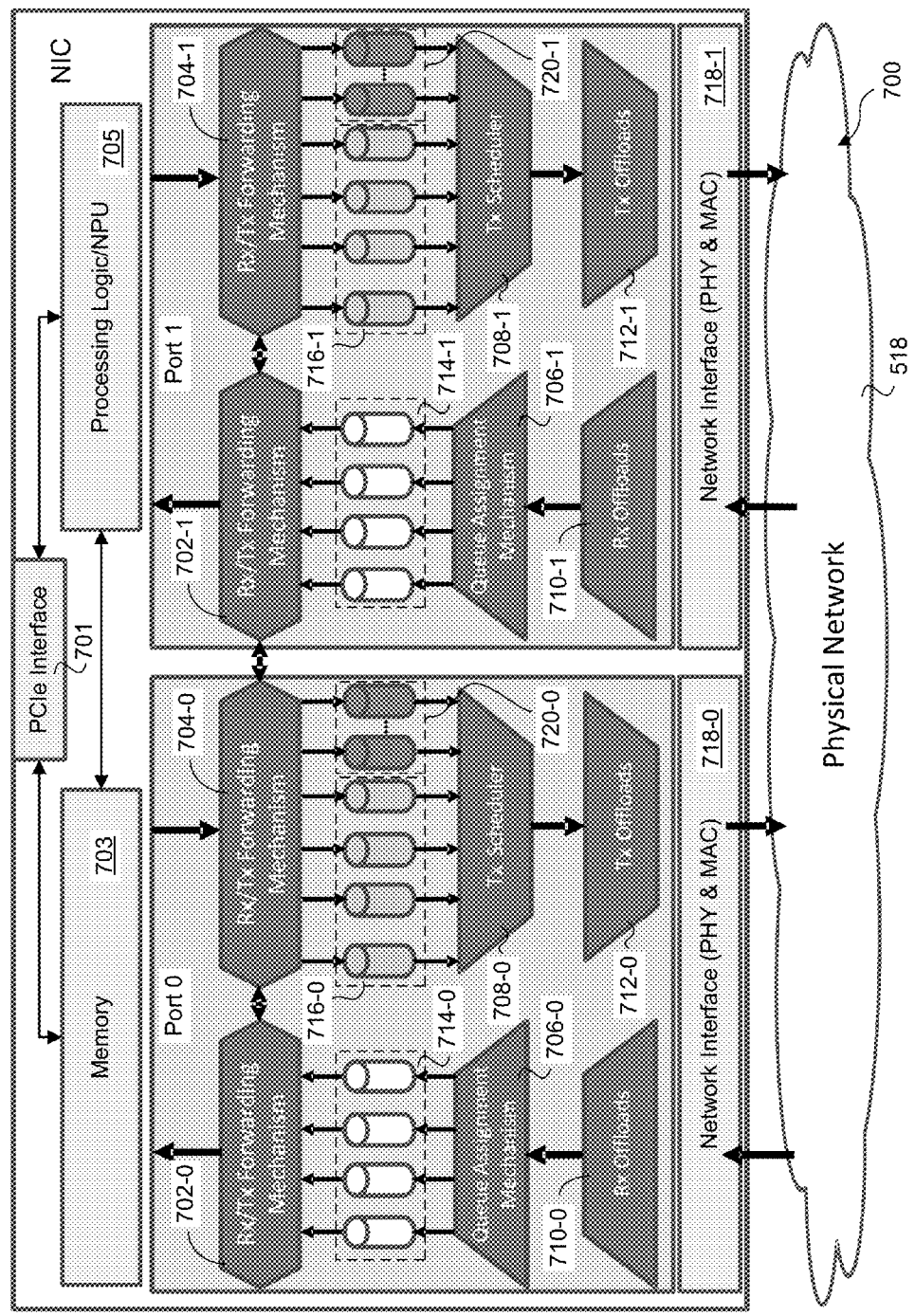
FIG. 7a is a schematic block diagram of an exemplary 2-port NIC architecture, according to one embodiment.
Figure 7B:
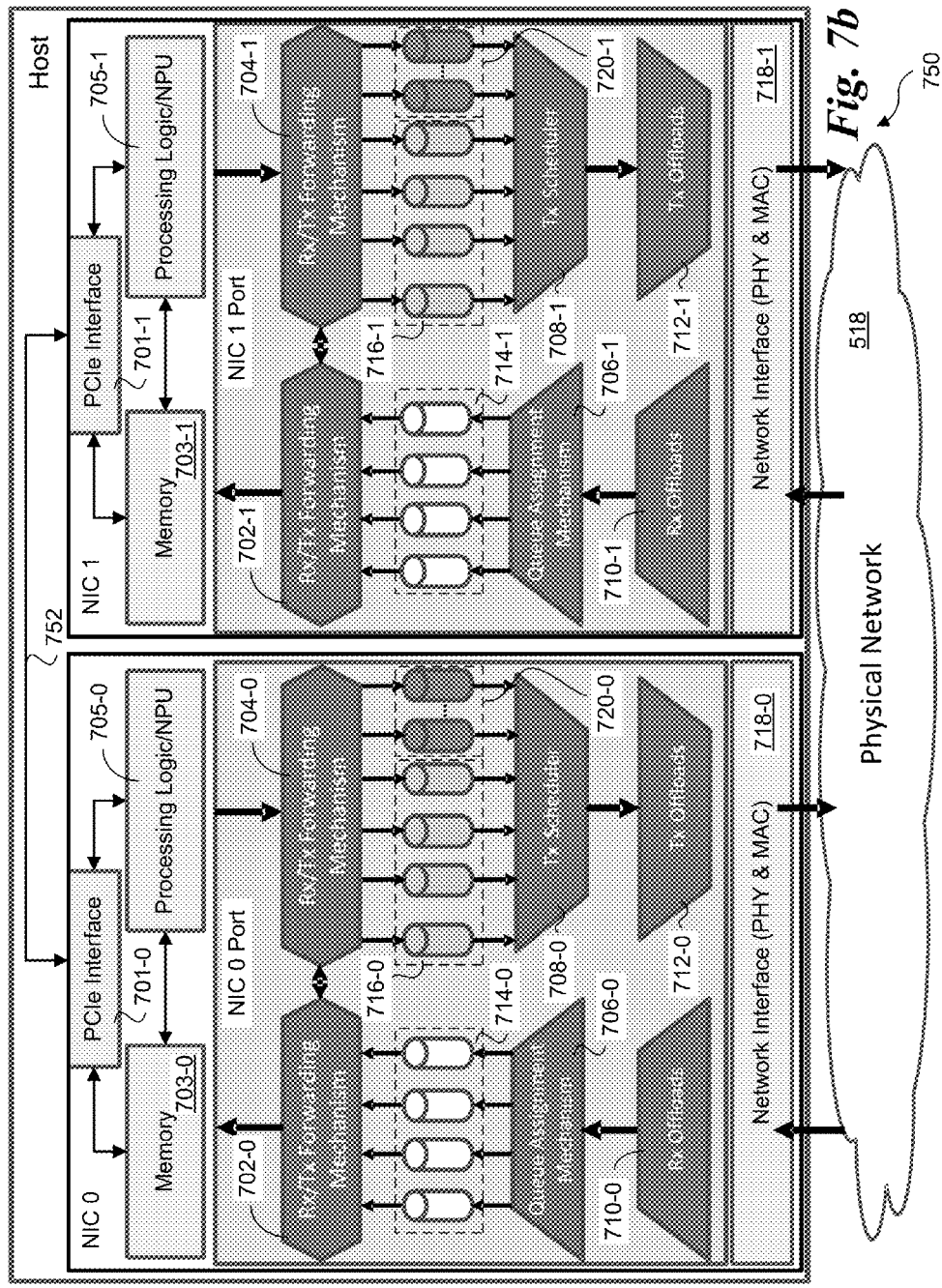
FIG. 7b is a schematic block diagram of an exemplary host architecture employing two NICs, according to one embodiment.

System architecture 500 also includes system memory 514 coupled to memory controller 510, and a NIC 515 including four ports 0-3, connected to PCIe interface 512 via a PCIe interconnect 516 coupled to NIC 515 at a PCIe interface (I/F) 517. Each of NIC ports 0-3 includes a network interface comprising a physical network port that is coupled via PHY and MAC facilities (not shown) to a set of Rx queues and Tx queues, with each of the physical ports communicatively coupled to a physical network 518 via an applicable physical interface, which may include a wired connection (e.g., Ethernet), a wireless connection (e.g., 802.11-based connection), or an optical connection. Further details of one embodiment of a NIC configured with hardware forwarding mechanisms and associated Rx and Tx queues and other components are shown in FIGS. 7a and 7b and discussed below.

Also depicted in system memory 514 is an operating system (OS) 520 including a NIC driver 521 and an application space 522. OS 520 is configured as multiple modules implementing associated processes, services and drivers when booted and executed on one or more of cores 504. Application space 522 comprises a portion of system memory address space that is allocated by OS 520 for applications that are hosted by OS 520. These applications include a virtual machine manager VMM 524 and four virtual machine instances VM 0, VM 1, VM 2, and VM 3.

As its name implies, each virtual machine instance operates as a virtual processing system. This is facilitated, in part, via VMM 524 (also sometimes referred to as a hypervisor), which maps virtual resources employed by each VM to corresponding physical resources in system architecture 500. These include processor resources, memory resources, and networking resources. Each VM hosts its own operating system 526 including a network stack 528. Each VM further is depicted as logically including a virtual NIC 530, which represents a virtual instance of a NIC including a virtual MAC address.

VMM 524 is implemented as a software application running in application space 522. The VMM is configured to map the virtual processor resources for each of VMs 0, 1, 2, and 3 to a respective processor core 504, such that from the perspective of each VM, it is allocated the full processing resources of its own single-core processor. Optionally, in embodiments employing processors supporting hyper-threading, the processor resources for each VM may logically appear as a dual-core processor.

NIC driver 521 is configured to provide each of the hardware forwarding mechanisms in a system's NIC ports with applicable filter information, such as discussed above and illustrated in FIG. 4 for an individual NIC port. To facilitate this function, NIC driver 521 generates and stores corresponding NIC Rx and Tx queue addresses, along with offsets to the Rx and Tx ports of the other NICs (or NIC ports, as applicable), as depicted by NIC configuration data 532.

During system initialization or during ongoing run-time operations, NIC driver 521 writes or otherwise provides access to the queue and port offset data to memory on-board the NIC(s). For example, in one embodiment a portion of a NICs memory is memory-mapped IO (MMIO) address space that may be directly written to by NIC driver 521. As described in further detail below, this information is used by the hardware forwarding mechanisms during run-time operations to effect hardware-based forwarding.

Figure 5A:
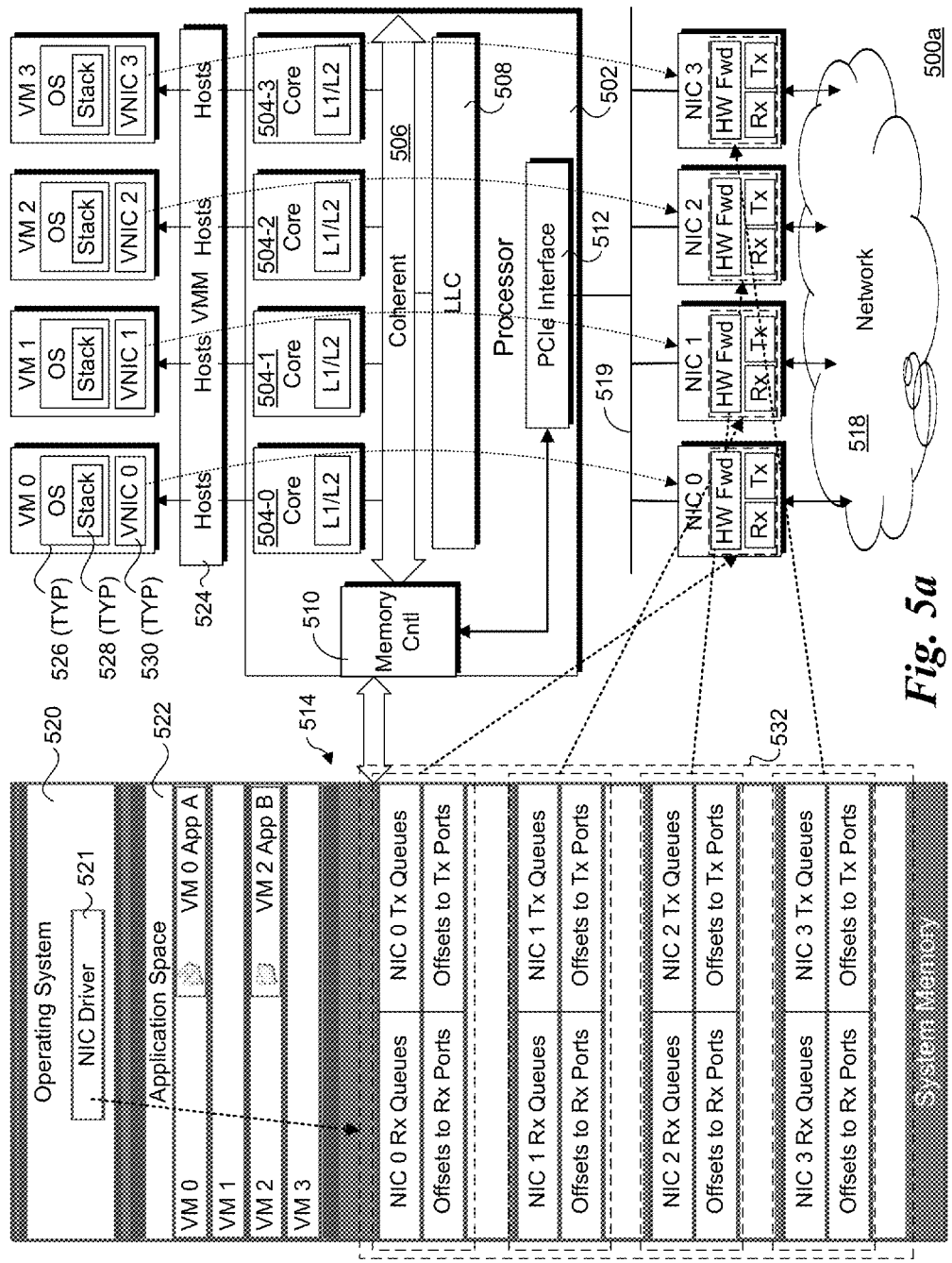
FIG. 5a is a schematic block diagram illustrating a variation of the computer system of FIG. 5 under which the 4-port NIC is replaced by 4 separate NICs.

FIG. 5a shows a system architecture 500a that is similar to system architecture 500, except the four Ports 0, 1, 2, and 3 of NIC 515 have been replaced with separate single-port NICs 0, 1, 2, and 3. In addition, these NICs are coupled to a PCIe interconnect bus 519 that supports communication between each NIC and PCIe interface 512, as well as between each other. Communication over PCIe is facilitated by PCIe interfaces on each NIC (not shown). As an option to using a PCIe bus configuration, each of NICs 0-3 may be coupled to PCIe interface 512 via its own point-to-point interconnect (not shown).

As discussed above, each VM hosts a respective operating system instance, wherein from the perspective of the operating system the OS is running on physical hardware. Moreover, the operating systems hosted by VMs are typically the same operating systems that run on a physical machine, such as a Microsoft Windows OS, a Linux- or Unix-based OS. Accordingly, each operating system instance employs its own set of drivers and employs its own networking and memory management facilities. Instances of these components when the OS is hosted on a virtual machine are commonly termed "virtualized" or "virtual" because they aren't directly running on physical hardware; rather, facilities in the VMM map the virtual resources to corresponding physical resources in the system architecture.

Figure 5B:
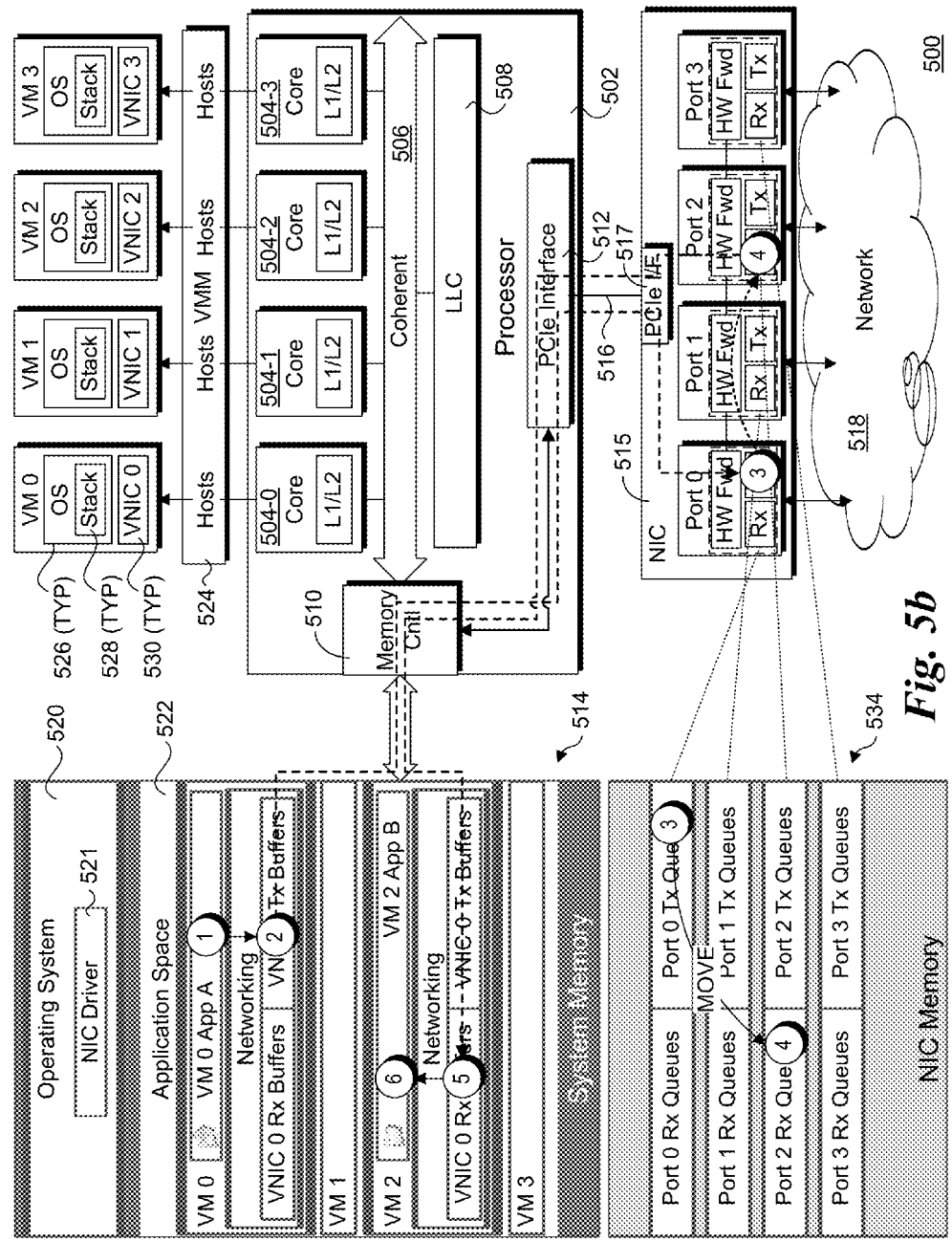
FIG. 5b is a combination schematic block diagram and data flow diagram illustrating an example of a hardware-based MAC frame forwarding process implemented using the computer architecture of FIG. 5.
Figure 5C:
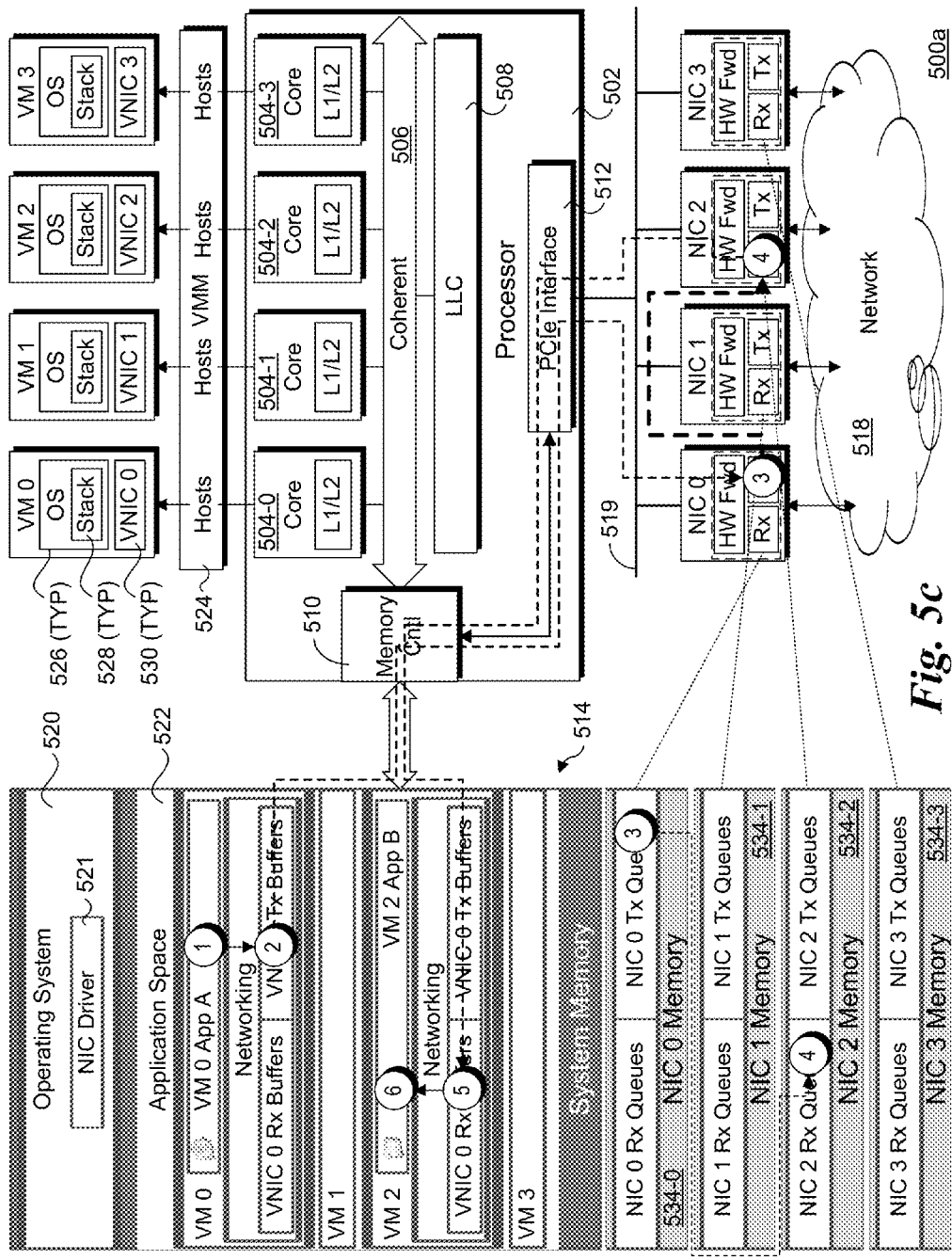
Figure 6:
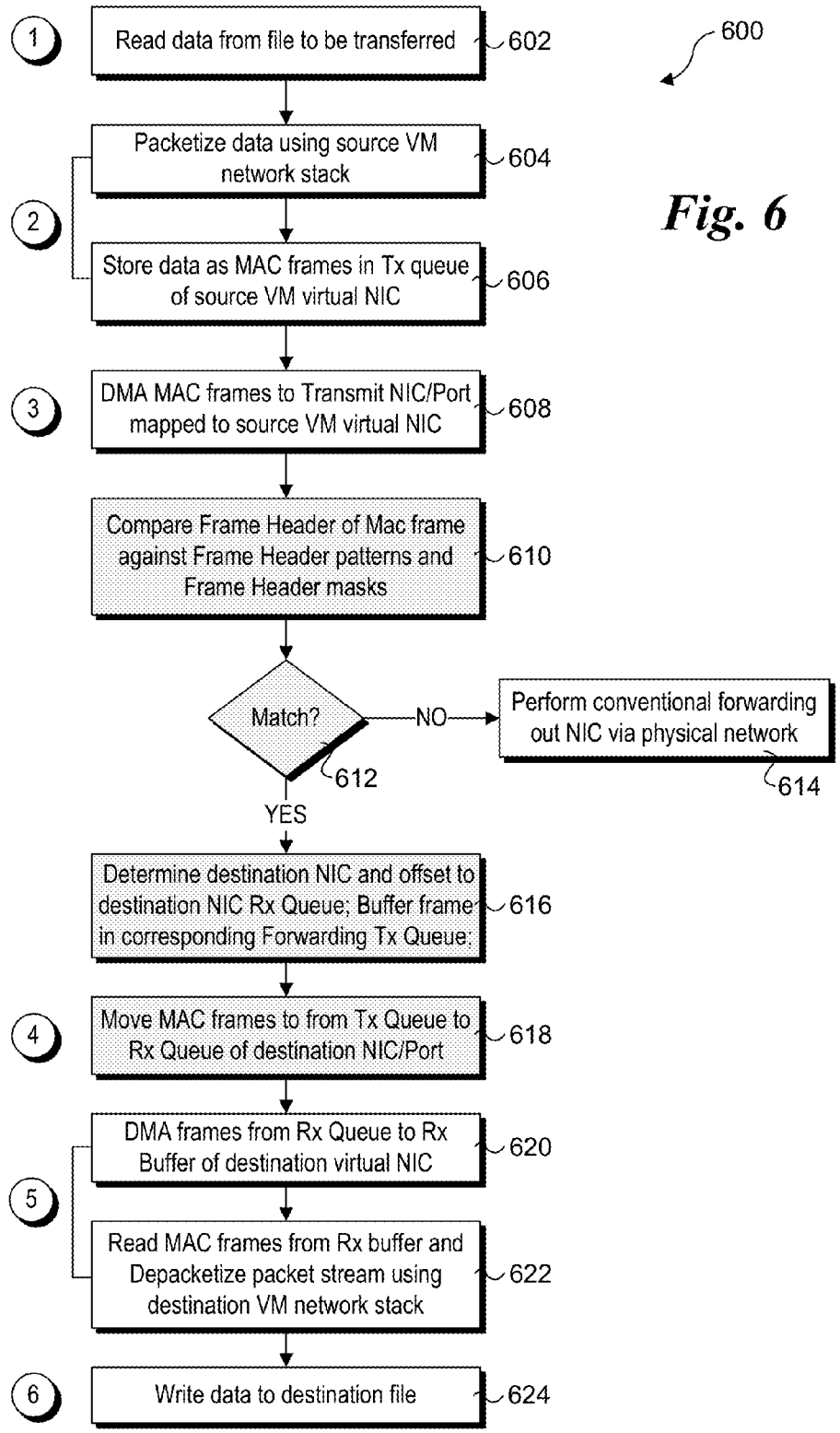
FIG. 6 is a flowchart illustrating operations and logic performed in connection with transferring data between two virtual machines using a transfer path that includes hardware-based forwarding of MAC frames, according to one embodiment.

FIGS. 5b and 5c further show data flow paths associated with a transfer of a file from an (App)lication A running on VM 0 to an App B running on VM 2 under system architectures 500 and 500a, respectively. Meanwhile, operations and logic for facilitating the file transfer according to one embodiment is shown in a flowchart 600 of FIG. 6, while encircled numbers are shown in each of FIGS. 5b, 5c, and flowchart 600 to depict corresponding activities.

FIGS. 5b and 5c depict portions of application space 522 in system memory 514 allocated to VMs 0, 1, 2, and 3. In actual practice, a VM host software application including a VMM would be allocated a large block of memory by the system OS for each VM (e.g., 1 Gbyte), and the VM memory management would be performed through use of the VMM or hypervisor and not directly via the system OS. However, for ease of understanding and to avoid clutter, the VM host software/VMM is not shown in application space 522, but rather just allocation of the address space to the VM's is shown.

The transfer process begins with a series of conventional operations depicted in blocks 602, 604, 606 and 608. These operations are generally the same as would be performed by a conventional implementation of a system configured to supporting network communication for multiple VMs. Accordingly, the process begins by reading data from the file to be transferred and processing the data with the VM's OS network stack software to generate packetized data that is stored as MAC frames in a Tx queue of the source (i.e., sending) VM virtual NIC (i.e., a Tx queue of VNIC 0). The corresponding operations are shown in blocks 602, 604, and 606. A MAC frame for an Ethernet network is also commonly referred to as an Ethernet frame, and includes a MAC source and destination address. At this stage, the MAC source address is a virtual MAC address allocated to VNIC 0, and the MAC destination address is a virtual MAC address allocated to VNIC 2.

In a block 608, MAC frames in the Tx queue are DMA'ed to the transmit NIC mapped to VNIC 0 by VMM 524, which in system architecture 500 is NIC network port 0 and in system architecture 500a is NIC 0. In addition to the DMA operation, this will entail translation of the MAC addresses in the MAC frames from virtual addresses to physical addresses. These translations are handled by VMM 524, and the MAC frames are initially transferred to a Tx buffer in NIC memory 534 (for system architecture 500) or NIC 0 memory 534-0 (for system architecture 500a).

As stated above, up to this point the operations are the same as used in a conventional network transfer of data from a VM. Meanwhile, operations shown in shaded blocks 610, 616, 618 and decision block 612 are novel operations that are implemented via embodiments of the hardware forwarding mechanisms disclosed herein. These operations begin in block 610, wherein the frame header data for each MAC frame (that is being processed for outbound traffic) is compared against frame header patterns and frame header masks defined in the input sets for the port. For example, an exemplary set of frame header patterns and masks are shown in FIG. 4, as discussed above. Generally, the frame header patterns and masks for supporting VM-to-VM transfers are configured to 1) detect MAC frames corresponding to data (packets) that are destined for another VM hosted in the same system; and 2) for such frames, determine the address offset to an applicable NIC (port) and Rx queue to move the frame to. The result of the first determination is shown in decision block 612. If the MAC destination address in the frame corresponds to a network port that is not one of the ports on the system (i.e., the destination network port is located on a separate system), the logic proceeds to a block 614 in which conventional forwarding operations are performed under which the frame is queued to a Tx queue to be forwarded out of the NIC port via physical network 518.

If the result of decision block 612 is a match, the hardware forwarding mechanism determines the applicable destination NIC/port and address offset to the Rx queue in the destination NIC to which the MAC frame is to be internally forwarded. It then determines a corresponding Tx queue in the transmit NIC that is mapped to be forwarded to the determined Rx queue and buffers the MAC frame in that Tx queue. These operations are depicted in a block 616. In one embodiment, the Rx and Tx queues are identified via the to and from queue offset data in a corresponding input set used to filter the MAC frame.

In further detail, FIG. 7a shows one embodiment of a NIC architecture 700 configured to facilitate hardware-based forwarding. NIC architecture 700 includes two NIC ports 0 and 1, each having a similar configuration, a PCIe interface 701, local memory 703 and processing logic and/or a network processor unit (NPU) 705. Each of ports 0 and 1 is configured to include a pair of Rx/Tx forwarding mechanisms 702 and 704, a queue assignment mechanism 706, a Tx scheduler 708, an Rx offloads block 710, and a Tx offloads block 712, wherein a −0 or −1 suffix is added to each reference number to identify the port each respective component is associated with. Each of the ports also includes a set of Rx queues 714 and a set of Tx queues 716, which are conventional queues, along with a network interface 718 that includes components and logic for implementing PHY and MAC layer operations. The ports further include a set of Tx forwarding queues 720, each of which is mapped to a corresponding Rx queue or Tx queue in another NIC port on the system based on the aforementioned queue forwarding data.

At some levels, the NIC architecture 700 shown in FIG. 7a illustrates logical associations between port components rather than an actual physical implementation of such components within a corresponding port. For example, while the Rx and Tx queues are depicted within the Port 0 and Port 1 blocks of FIG. 7a, it will be recognized that these queues represent respective portions of the address space of memory 703 allocated for each queue. Similarly, one or more of the Rx offloads blocks 710, Tx offloads blocks 712, queue assignment mechanisms 706, Tx schedulers 708 and hardware forwarding mechanisms 702 and 704 may be implemented via corresponding embedded logic proximate to other physical components for a given port and/or via processing logic/NPU 705.

Suppose the Port 0 in NIC architecture 700 corresponds to port 0 in NIC 515. As data frames are received at Rx/Tx forwarding mechanism 704-0, a frame header match is performed using frame header filter criteria that is specific to the computer system's port MAC addresses. If the frame contains a packet or packets that is/are destined for another system (e.g., a server or client on the same LAN (Local Area Network)), the destination MAC address will correspond to a network port that is on that other system. Conversely, if the packet is destined for another VM in the same system, the port via which that packet is to be internally forwarded, along with the Rx queue associated with the port, is identified. The frame is then added to a Tx queue among Tx forwarding queues 718 that is internally mapped to the identified Rx queue.

Continuing flowchart 600 at block 618, the MAC frame in the Tx queue is moved to the Rx queue of the identified NIC or NIC port (as applicable). When moved between Tx and Rx queues associated with ports on the same NIC, this may be accomplished with a memory move operation, as depicted in NIC memory 534 of FIG. 5b. When the Tx and Rx queues are on different NICs, a copy of the MAC frame is written to the Rx queue using a PCIe write transaction that uses the address of the PCIe interface of the destination NIC (i.e., the NIC having the Rx queue). In architecture 500a of FIG. 5c, this PCIe transaction path originates at NIC 0 and ends at NIC 2. It is noted that the destination NIC (or destination port) as used in this example is the same NIC or port at which the frame would be forwarded via physical network 518 if the frame was forwarded in the conventional manner.

Once in the Rx queue, the MAC frame is processes in the same manner as the conventional process under which the MAC frame would have been received at the destination NIC/port. These operations are shown in blocks 620, 622, and 624, and begin with the frames in the Rx queue being DMA'ed to an Rx buffer in the destination virtual NIC, which in this case is VNIC 2. In a manner similar but reverse to that described above, VMM 524 is employed to translate the physical MAC addresses back to virtual MAC addresses, such that the source and destination MAC addresses are returned to their original values when they were created by the networking software of VM 0. Once in the VNIC 2 Rx buffer and having reached the top of the buffer, the MAC frames are sequentially read and the packets in embedded in the stream of MAC frames are depacketized using the networking software facilities of VM 2. The depacketized data is then written to the destination file for APP B, completing the file transfer process in block 624.

The foregoing examples illustrated hardware-based forwarding of MAC frames between Tx forwarding queues and Rx queues. However, this is not meant to be limiting, as under principles and teachings of the embodiments herein, hardware-based forwarding of MAC frames may be implemented via pairs of queues of the same or different types as defined by the queue forwarding data for corresponding input sets with matching MAC frame filter data.

For example, hardware forwarding mechanism 702 may be implemented to effect forwarding of MAC frames from an Rx queue to either another Rx queue or a Tx queue within the same local NIC memory or between queues in memories on separate NICs. A hardware-based Rx queue to Rx queue forwarding may be applicable where a packet is received at a NIC port that is different than the NIC port allocated for a virtual NIC of a VM having an application that is a consumer of data conveyed by the MAC frame(s) being forwarded. For instance, suppose that a flow of MAC frames are received at NIC port 0, but the consumer of the data for the flow is an application hosted by a VM that has a virtual NIC implemented via NIC port 1. Recall that physical NICs employ physical MAC addresses, while virtual NICs employ virtual MAC addresses. By definition, MAC frames having a given physical MAC address may only be received at a NIC port having that same MAC address. This is fundamental to the operation of layer-2 switching. Meanwhile, a VMM or hypervisor may repurpose a given physical system resource, such as a NIC port, to a new virtual NIC having a new virtual MAC address. Under the hardware-based forwarding mechanism, an input set would have MAC header filtering data (e.g., a frame header pattern and mask) that would filter out MAC frames for the flow, with the from queue offset identifying an offset address of one of Rx queues 714-0 associated with NIC port 0 and the to queue offset identifying an offset address of one of Rx queues 714-1 associated with NIC port 1.

The hardware-based forwarding mechanism may also be implemented to forward data between Rx queues and Tx queues. For example, suppose that a computer system supporting hardware-based forwarding is implemented as a switch or bridge in a layer 2 sub-network as part of a larger network employing layer 3 forwarding (this scheme is sometimes used in data centers). Under this situation, MAC frames that are received at a first NIC port may forwarded from an Rx queue of the first NIC port to a Tx queue of a second NIC port to effect a layer 3 switching operation without use of the conventional software-based forwarding path. This provides a significant advantage over the traditional approach, under which MAC frames would be DMA'ed from Rx queues into system memory, IP packets would be extracted from the MAC frames by a software-based network stack, the appropriate port via which the IP packets are to be forwarded is identified via a forwarding table, followed by the IP packets being encapsulated in new MAC frames that are then DMA'ed into a Tx queue for that port.

FIG. 7b shows a host architecture 750 for a host system employing two single-port NICs 0 and 1. Each NIC in the illustrated embodiment show details or its single network port that is configured in a similar manner to the network ports in FIG. 7a. The primary difference between NIC architecture 700 and host architecture 750 is that under host architecture 750 the queues corresponding to the different network ports are in separate memory devices, as shown by memory 703-0 and 703-1. Each of NICs 0 and 1 is further associated with a respective processing logic/NPU 705 and PCIe interface 701, with the PCIe interfaces being connected via an interconnect 752. As a result of having separate memories, effecting forwarding between queues involves memory write operations into the destination queue rather than memory move operations between queues in the same memory.

Figure 8:
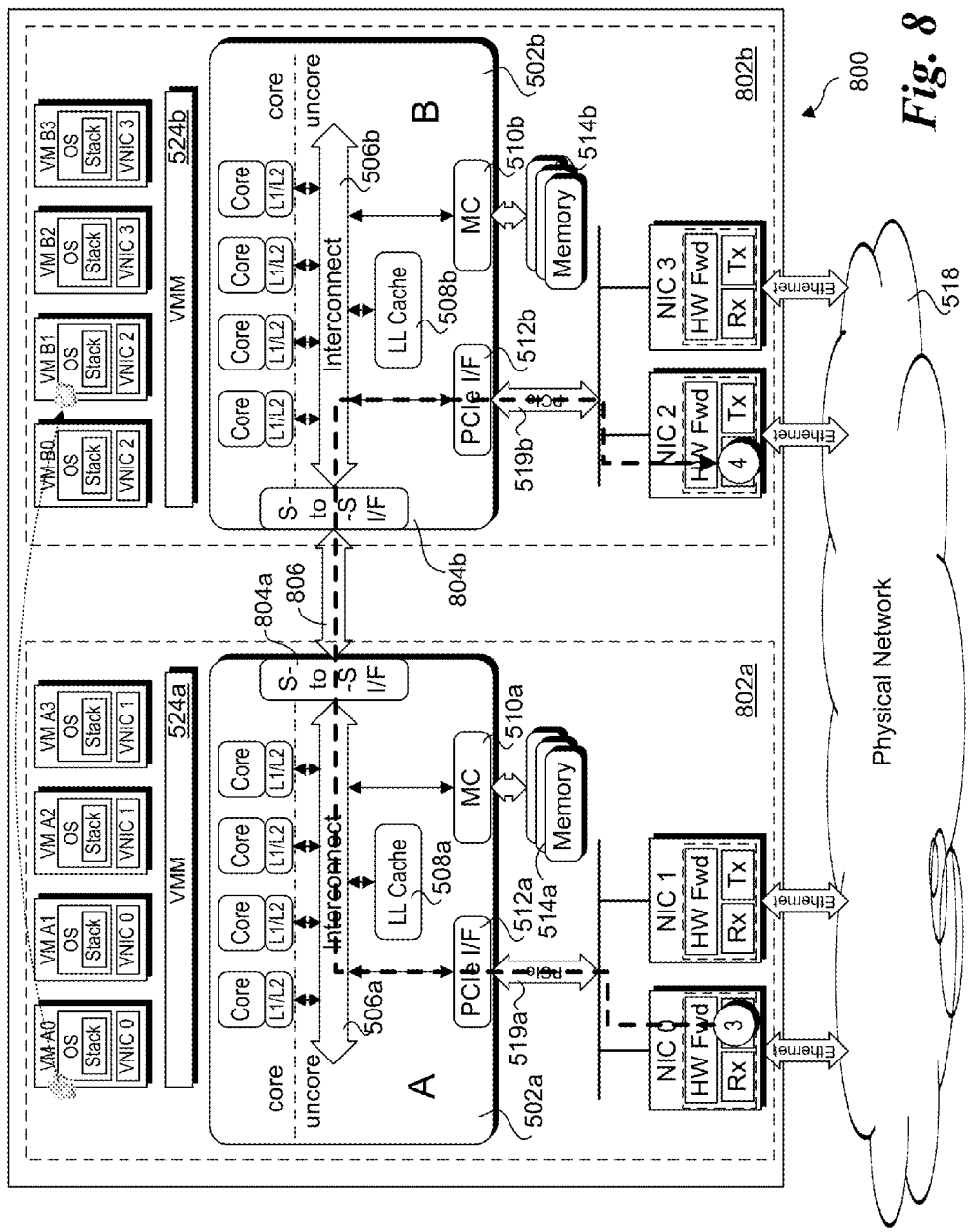
FIG. 8 is a schematic block diagram illustrating a 2-node NUMA system architecture, according to one embodiment.

In addition to system architectures employing a single processor with multiple cores, embodiments of the hardware forwarding mechanisms may be implemented under systems employing NUMA (Non-Uniform Memory Access) architectures. An example of one embodiment of hardware forwarding mechanism implementation under a NUMA architecture 800 is shown in FIG. 8. Under a NUMA architecture, each of multiple NUMA "nodes" is configured to operate as an independent system, somewhat akin to an embedded server or the like. Under this architecture, each node includes a processor or CPU, its own cache and memory resources, and its own networking resources. At the same time, memory access is configured such that a processor in a given node may access memory that is nominally associated with a processor for another node while maintaining memory coherency.

NUMA architecture 800 includes two nodes 802a and 802b, each including a respective processor 502a and 502b, which are also labeled 'A' and 'B'. Each of processors 502a and 502b employ an System on a Chip (SoC) architecture and are similarly configured, and include a "core" portion including a plurality of processor cores and L1/L2 caches, and an "uncore" portion including an interconnect 506, an LL cache (LLC) 508, a memory controller 510, a PCIe interface 512, and a socket-to-socket interface 804 (labeled S-to-S I/F). The socket-to-socket interfaces 804a and 804b support communication between processors 502a and 502b via an interconnect 806; in server platforms employing multiple processors the processors are commonly referred to as "sockets." The memory controller 510 for each processor is coupled to a set of memory modules implemented as system memory 514. Each NUMA node 802 further includes a pair of NICs that are accessed via a PCIe interconnect bus, which are labeled NIC 0 and NIC 1 for node 802a and NIC 2 and NIC 3 for node 802b.

In a manner similar to that employed in the embodiments of FIGS. 5 and 5a-c, the cores in each of processors 502a and 502b are employed to host a plurality of VMs, which are labeled VM A0, A1, A2, and A3 for processor A and VM B0, B2, B3, and B4 for processor B. A respective operating system (not shown) and VMM 524 is also implemented for each node.

In the example illustrated in FIG. 8, a file is being transferred from a first application running on VM A0 to a second application running on VM B1. The VNICs (labeled VNIC 0) for both VMs A0 and A1 are mapped to physical NIC 0 by VMM 524A, while the VNICs (VNIC 2) for VM's B0 and B1 are both mapped to physical NIC 2 by VMM 524B.

The transfer of the file between the applications respectively running on VMs A0 and B1 proceeds in the conventional manner for the most part, except that under the hardware forwarding mechanism the frames are forwarded between a Tx queue on NIC 0 to an Rx queue on NIC 2 as depicted via the dashed path between encircled numbers 3 and 4. Under the conventional approach, the frames would be output from NIC 0 to physical network 518 via a first Ethernet link to be received at an input port of NIC 2 from the network via a second Ethernet link. In addition to the information employed by each hardware forwarding mechanism for the embodiments discussed above, the forwarding information for a NUMA implementation may further identify the NUMA nodes NICs are associated with, or, alternatively, a global addressing scheme may be employed along with applicable interconnect protocols that support global routing. In one embodiment, there is a master NIC driver for the system that either is configured to directly provide the hardware forwarding information to all system NICs and/or NIC ports, or coordinates providing this information with slave NIC drivers for the other nodes. For example, in the case of a 4-node NUMA architecture, there may be one master NIC driver and three slave NIC drivers. The master NIC driver has a global view of the NIC, port, and Rx and Tx queue resources for the system.

Continuing with the example of FIG. 8, the hardware forwarding mechanism in NIC 0 determines that the frames need to be forwarded to an Rx queue in NIC 2, which is associated with a separate NUMA node. Under one embodiment, a PCIe memory write transaction is employed that is further facilitated through use of a PCIe to Intel® QuickPath (QPI) bridges or interfaces embedded in or attached to PCIe interfaces 512a and 512b. Each of PCIe and QPI employ a packet-based transport protocol, with QPI being employed for transactions within the processors and over socket-to-socket interconnect 806. Accordingly, each of Interconnects 506a, 506b, and socket-to-socket interconnect 806 comprises QPI link structures, in one embodiment.

In view of the foregoing, the forwarding of frames proceeds as follows. A first DMA memory write transaction is generated at the PCIe interface (not shown) of NIC 0, with a PCIe protocol destination address of the PCIe interface for NIC 2. The illustrative purposes, this example will consider how forwarding of a single MAC frame is handled. The MAC frame is encapsulated as the data payload of a PCIe packet that is forwarded to PCIe interface 512a. At this PCIe interface, and QPI packet is generate via an embedded PCIe-to-QPI bridge or interface. In one embodiment, the QPI packet encapsulates the PCIe packet as its packet payload. The QPI packet is then forwarded via interconnect 506, socket-to-socket interconnect 806 and interconnect 506b using the QPI protocol to PCIe interface 512b. At this PCIe interface, the encapsulated PCIe packet is extracted from the QPI packet at a second PCIe-to-QPI bridge or interface, and the extracted PCI packet is employed in a second PCIe transaction originating from PCIe interface 512b with a destination address of the PCIe interface in NIC 2. The packet is then forwarded between PCIe interface 512b and NIC 2 via PCIe interconnect 519b. Upon receipt of the PCIe packet at NIC 2, the MAC frame is extracted and the hardware forwarding mechanism places the MAC frame in the appropriate Rx queue. As before, at this point the MAC frame is processed in the same manner as if it was received from physical network 518, eventually being forwarded internally within node 802b to be handed by the virtual networking facilities of VM B1 and written to the destination file.

In some embodiments, provisions are implemented to avoid looping caused by mis-configurations, potentially causing frames to be infinitely looped along the same forwarding path. Under one approach, only a portion of frames are checked for filtering against the rules of a new queue: if it is forwarded to an Rx queue, the frame will have to take the software path of getting consumed by the NIC driver, or if it ends up in a Tx queue the hardware will inject it into the network via the standard transmission path.

The hardware-based forwarding techniques disclosed herein provide significant advantageous of the conventional software-based approach. First, when moving frames between ports on the same NIC, it eliminates the PCIe traffic that would be generated to and from the memory controller, thus freeing up bandwidth in the PCIe bus. Second, the techniques eliminate all the CPU utilization for moving frames between any ports attached on the host, allowing the host processors to execute applications and/or VMs more effectively. Third, for NUMA-based platforms, it eliminates cross- NUMA node memory accesses. It also eliminates cache trashing that is often incurred when moving frames between any ports attached to the host. Furthermore, in virtualized environments, the VMM or hypervisor (or a VM invoking the same) can perform in-host switching with zero CPU utilization (outside cycles allocated for VMM/hypervisor execution).

The following examples pertain to further embodiments. In an embodiment, a method is implemented within a computer system having first and second Network Interface Controller (NIC) ports communicatively coupled to a physical network external to the computer system. In accordance with the method, Media Access Channel (MAC) frame is received at the first NIC port, a determination is made to whether the MAC frame is to be forwarded to the second NIC port, and forwarding of the MAC frame is from the first NIC port to the second NIC port is effected by moving or copying data corresponding to the MAC frame from a first queue associated with the first NIC port to a second queue associated with the second NIC port.

In an embodiment of the method, the MAC frame includes a data payload corresponding to a portion of data being transferred from a first virtual machine (VM) hosted by the computer system and having a virtual network resource physically implemented by the first NIC port to a second VM hosted by the computer system and having a virtual network resource physically implemented by the second NIC port.

In one embodiment of the method, the first and second NIC ports are ports in the same NIC. Alternatively, in another embodiment the first and second NIC ports are in separate NICs.

In an embodiment of the method, the forwarding of the MAC frame is implemented via a hardware-based mechanism. In one embodiment the method further includes receiving NIC port queue configuration information and MAC frame header forwarding filter data, receiving a MAC frame including a MAC frame header at a hardware forwarding mechanism associated with the first NIC port, the MAC frame including a header comprising a source MAC address and a destination MAC address, comparing the destination MAC address against the MAC frame header forwarding filter data to determine whether the MAC frame is destined for another NIC port in the computer system; and, if the MAC frame is destined for another NIC port in the computer system, and copying or moving data corresponding to the MAC frame to a queue associated with the NIC port that is identified.

In an embodiment, forwarding the MAC frame comprises writing data contained in the MAC frame to a receive queue for the second NIC port. In an embodiment, this is accomplished by writing the data to a transmit queue on the first NIC port, and moving or copying the data from the transmit queue to the receive queue. In an embodiment, the first NIC port and the second NIC port are on the same NIC that includes local memory having respective address space allocated to transmit and receive queues for each of the first and second NIC ports, and the data contained in the MAC frame is moved from a transmit queue to a receive queue in the local memory. In an embodiment, the transmit queue is mapped to the receive queue such that any MAC frames that are written to the transmit queue are automatically moved to the receive queue via a hardware mechanism. In an embodiment, the first NIC port and second NIC ports are on separate NICs, and the method further includes copying the data in the transmit queue on the first NIC port of the first NIC to a receive queue of the second NIC port on the second NIC using a memory write transaction comprising one or more packets transported via an interconnect between the first and second NICs.

In an embodiment, the computer system comprises a non-uniform memory access (NUMA) architecture employing first and second NUMA nodes, each NUMA node including a processor operatively coupled to a respective NIC, wherein the first NIC port is included in a first NIC of a first NUMA node and the second NIC port is included in a second NIC of a second NUMA node.

In an embodiment, the first queue comprises a receive queue associated with the first NIC port and the second queue comprises a receive queue associated with the second NIC port. In an embodiment, the first queue comprises a transmit queue associated with the first NIC port and the second queue comprises a transmit queue associated with the second NIC port.

In accordance with further embodiments, apparatus are configured with means for performing the foregoing method operations. In an embodiment, the apparatus has first and second NIC ports and is configured to be installed in a computer system, wherein the first and second NIC ports configured to be communicatively coupled to a physical network external to the computer system when the apparatus is installed and operating. The apparatus further includes means for receiving a Media Access Channel (MAC) frame at the first NIC port, means for determining the MAC frame is to be forwarded to the second NIC port, and mean for effecting forwarding of the MAC frame from the first NIC port to the second NIC port by moving or copying data corresponding to the MAC frame from a first queue associated with the first NIC port to a second queue associated with the second NIC port.

In an embodiment of an apparatus, the MAC frame includes a data payload corresponding to a portion of data being transferred from a first virtual machine (VM) hosted by the computer system and having a virtual network resource physically implemented by the first NIC port to a second VM hosted by the computer system and having a virtual network resource physically implemented by the second NIC port. In respective embodiments of the apparatus, the first and second NIC ports are on the same NIC, or alternatively on separate NICs.

In an embodiment, the apparatus is configured to forward the MAC frame via a hardware-based mechanism. In an embodiment, the apparatus includes means for receiving NIC port queue configuration information and MAC frame header forwarding filter data, means for receiving a MAC frame including a MAC frame header at a hardware forwarding mechanism associated with the first NIC port, the MAC frame including a header comprising a source MAC address and a destination MAC address, and means for comparing the destination MAC address against the MAC frame header forwarding filter data to determine whether the MAC frame is destined for another NIC port in the computer system, and, if the MAC frame is destined for another NIC port in the computer system, copying or moving data corresponding to the MAC frame to a queue associated with the NIC port that is identified.

In an embodiment, an apparatus effects forwarding of MAC frame bywriting data contained in the MAC frame to a receive queue for the second NIC port. In an embodiment, the apparatus further includes means for writing the data to a transmit queue on the first NIC port, and means for moving or copying the data from the transmit queue to the receive queue. In an embodiment, the first NIC port and the second NIC port are on the same NIC that includes local memory having respective address space allocated to transmit and receive queues for each of the first and second NIC ports, and further wherein the data contained in the MAC frame is moved from a transmit queue to a receive queue in the local memory. In an embodiment, the transmit queue is mapped to the receive queue such that any MAC frames that are written to the transmit queue are automatically moved to the receive queue via a hardware mechanism. In an embodiment, the first NIC port and second NIC ports are on separate NICs, and the apparatus further includes means for copying the data in the transmit queue on the first NIC port of the first NIC to a receive queue of the second NIC port on the second NIC using a memory write transaction comprising one or more packets transported via an interconnect between the first and second NICs.

In an embodiment, an apparatus includes, an interconnect interface, memory, having an address space, and a plurality of network ports coupled in communication via an internal interconnect, each network port having a network interface. The apparatus further includes logic configured, upon operation of the apparatus, to allocate portions of the address space to sets of queues for each of the plurality of network ports, wherein each set of queues includes a plurality of Rx queues and a plurality of transmit Tx queues, wherein a portion of the Tx queues are Tx forwarding queues mapped to at least one of Rx and Tx queues in other network ports on the apparatus, and wherein each network port further includes at least one hardware-based forwarding mechanism, configured, upon operation of the apparatus, to compare header data in a Media Access Control (MAC) frame against MAC frame header filter data to determine if the MAC frame is to be forwarded to another network port in the apparatus; and in response to a determination that the MAC frame is to be forwarded to another network port, moving or copying the MAC frame from a first queue allocated to the network port to a second queue allocated to the other network port.

In an embodiment, the first queue comprises a Tx forwarding queue to the second queue comprises an Rx queue to which the Tx forwarding queue is mapped. In an embodiment, the apparatus is further configured, upon operation, to receive Rx and Tx queue configuration information via the interconnect interface, the memory Rx and Tx queue configuration information defining memory address space allocations for each Rx and Tx queue, and configure the memory address space in accordance with Rx and Tx queue configuration information. In an embodiment, the apparatus is further configured to receive MAC frame header filter data via the interconnect interface, receive queue forwarding data via the interconnect interface, and implement the MAC frame header filter data and queue forwarding data to effect moving data between pairs of queues, wherein the queues in a pair of queues are associated with different network ports.

In an embodiment, the MAC header filter data and the queue forwarding data comprises a plurality of sets of data, wherein each set includes: a frame header pattern; a frame header mask; a from queue address offset; and a to queue address offset.

In an embodiment, the plurality of network ports includes a first network port and a second network port, and wherein the apparatus is further configured, upon operation and when the first and second network ports are coupled to a network, to, receive a MAC frame at the first network port from the network, buffer the MAC frame in an Rx queue associated with the first network port, determine that the MAC frame is to be forwarded out of the second network port, and move the MAC frame from the Rx queue to a Tx forwarding queue of the second network port. In an embodiment, the first network port further comprises a second hardware forwarding mechanism that is configured to filter MAC frames received from the network and move MAC frames meeting corresponding filter criteria from Rx queues associated with the first network port to Tx queues associated with the second network port.

In an embodiment, the apparatus includes a network interface controller (NIC) and is further configured to be installed in a computer system having a plurality of NICs having a similar configuration, and wherein, upon operation, the apparatus is further configured to, facilitate forwarding of a MAC frame from a Tx forwarding queue to a receive queue in another NIC through use of a memory write transaction originating from the interconnect interface. In an embodiment, the interconnect interface comprises a Peripheral Component Interconnect Express (PCIe) interface, and the memory write transaction comprises a PCIe memory write transaction.

In an embodiment, the plurality of network ports includes a first network port and a second network port, wherein the first network port comprises a second hardware forwarding mechanism and wherein the apparatus is further configured, upon operation and when the first and second network ports are coupled to a network, to, receive a MAC frame at the first network port from the network, buffer the MAC frame in a first Rx queue associated with the first network port, determine, via the second hardware forwarding mechanism, that the MAC frame is to be moved to a second Rx queue associated with the second network port, and move the MAC frame from the first Rx queue to the second Rx queue.

According to further aspects of this disclosure, embodiments of computer system are provided. In one embodiment, the computer system includes a processor having a plurality of processor cores operatively couple to a memory controller and a first interconnect interface, system memory, operatively coupled to the memory controller, and a first and second Network Interface Controller (NIC), operatively coupled to the processor. In an embodiment, each of the first and second NICs includes an interconnect interface, operatively coupled to the first interconnect interface via a NIC to processor interconnect, local memory having a local address space, and one or more network ports, each network port having a network interface. In an embodiment, each of the first and second NICs further includes logic configured, upon operation of the computer system, to allocate portions of its local address space to sets of queues for each of its one or more network ports, wherein each set of queues includes a plurality of receive (Rx) queues and a plurality of transmit (Tx) queues, wherein a portion of the Tx queues are Tx forwarding queues that are mapped to queues associated with other network ports. In an embodiment, each NIC port further includes at least one hardware-based forwarding mechanism, configured, upon operation of the computer system, to, compare header data in a Media Access Control (MAC) frame against MAC frame header filter data to determine if the MAC frame is to be forwarded to another network port; and in response to a determination that the MAC frame is to be forwarded to another network port, and move or copy the MAC frame from a first queue allocated a network port on the NIC to a second queue allocated to the other network port.

In an embodiment of a computer system, the first queue is allocated to a network port on the first NIC, and the second queue is allocated to a network port on the second NIC. In an embodiment, the computer system further includes at least one NIC driver that is configured, upon operation of the computer system to send, to each NIC, Rx and Tx queue configuration information defining portions of local memory address space to be implemented as Rx and Tx queues allocated to the one or more network ports for that NIC and send MAC frame header filter data and queue forwarding data applicable to the one or more network ports for that NIC. In an embodiment, each NIC is further configured to implement its local memory address space in accordance with the Rx and Tx queue configuration information it receives, and each network port is further configured to implement the MAC frame header filter data and queue forwarding data applicable to the network port to effect moving or copying MAC frame data between queues allocated to the network port and queues allocated to one or more other network ports.

In an embodiment, the NIC to processor interconnect comprises a Peripheral Component Interconnect Express (PCIe) interconnect, and wherein the first and second NICs are configured to copy MAC frame data from a first queue associated with a first network port on the first NIC to a second queue associated with a second network port on the second NIC using a PCIe memory write transaction.

In an embodiment, the system further includes a NIC driver comprising data and instructions that, when executed by a processor core, cause the NIC driver to effect operations including defining memory allocation and address data for Rx and Tx queues for each of the network ports, defining MAC frame filtering data and corresponding queue forwarding data, and providing, to each of the first and second NICs, the memory allocation and address data and the MAC frame filtering data and queue forwarding data applicable to the one or more network ports associated with that NIC.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software running on a server or firmware executed by an embedded processor on a NIC. Thus, embodiments of this invention may be used as or to support a software program, software modules, firmware, and/or distributed software executed upon some form of processing core (such as the CPU of a computer, one or more cores of a multi-core processor), a virtual machine running on a processor or core or otherwise implemented or realized upon or within a machine-readable medium. A machine-readable medium includes any mechanism for storing or transmitting information in a form readable by a machine (e.g., a computer). For example, a machine-readable medium may include a read only memory (ROM); a random access memory (RAM); a magnetic disk storage media; an optical storage media; and a flash memory device, etc.

In addition, embodiments of the NIC aspects of the present description may be implemented not only within one or more semiconductor chips, but also within machine-readable media. For example, the designs described above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method implemented within a computer system having at least one host processor and having first and second Network Interface Controller (NIC) ports communicatively coupled to a physical network external to the computer system, the method comprising:
receiving a Media Access Channel (MAC) frame at the first NIC port;
determining the MAC frame is to be forwarded to the second NIC port; and
effecting forwarding of the MAC frame from the first NIC port to the second NIC port by moving or copying data corresponding to the MAC frame from a first queue associated with the first NIC port to a second queue associated with the second NIC port,
wherein determining the MAC frame is to be forwarded to the second NIC port and the moving or copying data from the first queue to the second queue are performed independent of the at least one host processor.

2. The method of claim 1, wherein the MAC frame includes a data payload corresponding to a portion of data being transferred from a first virtual machine (VM) hosted by the computer system and having a virtual network resource physically implemented by the first NIC port to a second VM hosted by the computer system and having a virtual network resource physically implemented by the second NIC port.

3. The method of claim 1, wherein the first and second NIC ports are ports in the same NIC.

4. The method of claim 1, wherein the first and second NIC ports are in separate NICs.

5. The method of claim 1, wherein the forwarding of the MAC frame is implemented via a hardware-based mechanism.

6. The method of claim 5, further comprising:
receiving NIC port queue configuration information and MAC frame header forwarding filter data;
receiving a MAC frame including a MAC frame header at a hardware forwarding mechanism associated with the first NIC port, the MAC frame including a header comprising a source MAC address and a destination MAC address;
comparing the destination MAC address against the MAC frame header forwarding filter data to determine whether the MAC frame is destined for another NIC port in the computer system; and, if the MAC frame is destined for another NIC port in the computer system,
copying or moving data corresponding to the MAC frame to a queue associated with the NIC port that is identified.

7. The method of claim 1, wherein effecting forwarding the MAC frame comprises writing data contained in the MAC frame to a receive queue for the second NIC port.

8. The method of claim 7, further comprising:
writing the data to a transmit queue on the first NIC port; and
moving or copying the data from the transmit queue to the receive queue.

9. The method of claim 8, wherein the first NIC port and the second NIC port are on the same NIC that includes local memory having respective address space allocated to transmit and receive queues for each of the first and second NIC ports, and further wherein the data contained in the MAC frame is moved from a transmit queue to a receive queue in the local memory.

10. The method of claim 9, wherein the transmit queue is mapped to the receive queue such that any MAC frames that are written to the transmit queue are automatically moved to the receive queue via a hardware mechanism.

11. The method of claim 8, wherein the first NIC port and second NIC ports are on separate NICs, the method further comprising:
copying the data in the transmit queue on the first NIC port of the first NIC to a receive queue of the second NIC port on the second NIC using a memory write transaction comprising one or more packets transported via an interconnect between the first and second NICs.

12. The method of claim 8, wherein the computer system comprises a non-uniform memory access (NUMA) architecture employing first and second NUMA nodes, each NUMA node including a processor operatively coupled to a respective NIC, wherein the first NIC port is included in a first NIC of a first NUMA node and the second NIC port is included in a second NIC of a second NUMA node.

13. The method of claim 1, wherein the first queue comprises a receive queue associated with the first NIC port and the second queue comprises a receive queue associated with the second NIC port.

14. The method of claim 1, wherein the first queue comprises a transmit queue associated with the first NIC port and the second queue comprises a transmit queue associated with the second NIC port.

15. An apparatus, comprising:
an interconnect interface;
memory, having an address space; and
a plurality of network ports coupled in communication via an internal interconnect, each network port having a network interface;
wherein the apparatus further includes logic configured, upon operation of the apparatus, to allocate portions of the address space to sets of queues for each of the plurality of network ports, wherein each set of queues includes a plurality of receive (Rx) queues and a plurality of transmit (Tx) queues, wherein a portion of the Tx queues are Tx forwarding queues mapped to at least one of Rx and Tx queues in other network ports on the apparatus, and
wherein each network port further includes at least one hardware-based forwarding mechanism, configured, upon operation of the apparatus, to,
compare header data in a Media Access Control (MAC) frame against MAC frame header filter data to determine if the MAC frame is to be forwarded to another network port in the apparatus; and in response to a determination that the MAC frame is to be forwarded to another network port,
moving or copying the MAC frame from a first queue allocated to the network port to a second queue allocated to the other network port.

16. The apparatus of claim 15, wherein the first queue comprises a Tx forwarding queue to the second queue comprises an Rx queue to which the Tx forwarding queue is mapped.

17. The apparatus of claim 15, wherein the apparatus is further configured, upon operation, to,
receive Rx and Tx queue configuration information via the interconnect interface, the memory Rx and Tx queue configuration information defining memory address space allocations for each Rx and Tx queue; and
configure the memory address space in accordance with Rx and Tx queue configuration information.

18. The apparatus of claim 17, wherein the apparatus is further configured, upon operation, to,
receive MAC frame header filter data via the interconnect interface;
receive queue forwarding data via the interconnect interface; and
implement the MAC frame header filter data and queue forwarding data to effect moving data between pairs of queues, wherein the queues in a pair of queues are associated with different network ports.

19. The apparatus of claim 18, wherein the MAC header filter data and the queue forwarding data comprises a plurality of sets of data, wherein each set includes:
a frame header pattern;
a frame header mask;
a from queue address offset; and
a to queue address offset.

20. The apparatus of claim 15, wherein the plurality of network ports includes a first network port and a second network port, and wherein the apparatus is further configured, upon operation and when the first and second network ports are coupled to a network, to,
    receive a MAC frame at the first network port from the network;
    buffer the MAC frame in an Rx queue associated with the first network port;
    determine that the MAC frame is to be forwarded out of the second network port; and
    move the MAC frame from the Rx queue to a Tx forwarding queue of the second network port.

21. The apparatus of claim 20, wherein the first network port further comprises a second hardware forwarding mechanism that is configured to filter MAC frames received from the network and move MAC frames meeting corresponding filter criteria from Rx queues associated with the first network port to Tx queues associated with the second network port.

22. The apparatus of claim 15, wherein the apparatus comprises a network interface controller (NIC) and is further configured to be installed in a computer system having a plurality of NICs having a similar configuration, and wherein, upon operation, the apparatus is further configured to,
    facilitate forwarding of a MAC frame from a Tx forwarding queue to a receive queue in another NIC through use of a memory write transaction originating from the interconnect interface.

23. The apparatus of claim 22, wherein the interconnect interface comprises a Peripheral Component Interconnect Express (PCIe) interface, and the memory write transaction comprises a PCIe memory write transaction.

24. The apparatus of claim 15, wherein the plurality of network ports includes a first network port and a second network port, wherein the first network port comprises a second hardware forwarding mechanism and wherein the apparatus is further configured, upon operation and when the first and second network ports are coupled to a network, to,
    receive a MAC frame at the first network port from the network;
    buffer the MAC frame in a first Rx queue associated with the first network port;
    determine, via the second hardware forwarding mechanism, that the MAC frame is to be moved to a second Rx queue associated with the second network port; and
    move the MAC frame from the first Rx queue to the second Rx queue.

25. A computer system, comprising:
    a processor having a plurality of processor cores operatively couple to a memory controller and a first interconnect interface;
    system memory, operatively coupled to the memory controller; and
    a first and second Network Interface Controller (NIC), operatively coupled to the processor, wherein each of the first and second NICs includes,
        an interconnect interface, operatively coupled to the first interconnect interface via a NIC to processor interconnect;
        local memory having a local address space; and
        one or more network ports, each network port having a network interface;
    wherein each of the first and second NICs further includes logic configured, upon operation of the computer system, to allocate portions of its local address space to sets of queues for each of its one or more network ports, wherein each set of queues includes a plurality of receive (Rx) queues and a plurality of transmit (Tx) queues, wherein a portion of the Tx queues are Tx forwarding queues that are mapped to queues associated with other network ports,
    and wherein each NIC port further includes at least one hardware-based forwarding mechanism, configured, upon operation of the computer system, to,
        compare header data in a Media Access Control (MAC) frame against MAC frame header filter data to determine if the MAC frame is to be forwarded to another network port; and in response to a determination that the MAC frame is to be forwarded to another network port,
        move or copy the MAC frame from a first queue allocated to a network port on the NIC to a second queue allocated to the other network port.

26. The computer system of claim 25, wherein the first queue is allocated to a network port on the first NIC, and the second queue is allocated to a network port on the second NIC.

27. The computer system of claim 25, wherein the system further includes at least one NIC driver that is configured, upon operation of the computer system to send, to each NIC, Rx and Tx queue configuration information defining portions of local memory address space to be implemented as Rx and Tx queues allocated to the one or more network ports for that NIC and send MAC frame header filter data and queue forwarding data applicable to the one or more network ports for that NIC,
    wherein each NIC is further configured to implement its local memory address space in accordance with the Rx and Tx queue configuration information it receives,
    and wherein each network port is further configured to implement the MAC frame header filter data and queue forwarding data applicable to the network port to effect moving or copying MAC frame data between queues allocated to the network port and queues allocated to one or more other network ports.

28. The computer system of claim 27, wherein the MAC frame header filter data and queue forwarding data comprises a plurality of sets of data, wherein each set includes:
    a frame header pattern;
    a frame header mask;
    a from queue address offset; and
    a to queue address offset.

29. The computer system of claim 25, wherein the NIC to processor interconnect comprises a Peripheral Component Interconnect Express (PCIe) interconnect, and wherein the first and second NICs are configured to copy MAC frame data from a first queue associated with a first network port on the first NIC to a second queue associated with a second network port on the second NIC using a PCIe memory write transaction.

30. The computer system of claim 25, further comprising a NIC driver comprising data and instructions that, when executed by a processor core, cause the NIC driver to effect operations comprising:
    defining memory allocation and address data for Rx and Tx queues for each of the network ports;
    defining MAC frame filtering data and corresponding queue forwarding data; and
    providing, to each of the first and second NICs, the memory allocation and address data and the MAC frame filtering data and queue forwarding data applicable to the one or more network ports associated with that NIC.

\* \* \* \* \*